United States Patent [19]

O'Hare

[11] Patent Number: 4,705,670

[45] Date of Patent: Nov. 10, 1987

[54] MULTIPLE OXIDATION NITROGEN FIXATION

[76] Inventor: Louis R. O'Hare, 1066A County Rd. 335, Pagosa Springs, Colo. 81147

[21] Appl. No.: 772,137

[22] Filed: Sep. 3, 1985

[51] Int. Cl.$^4$ ............................................. C01B 21/32
[52] U.S. Cl. .......................... 422/186.04; 422/186.24; 422/904
[58] Field of Search ................. 422/904, 186.24, 907, 422/186.07, 186.21, 186.04

[56] References Cited

U.S. PATENT DOCUMENTS

| | | | |
|---|---|---|---|
| 1,371,789 | 3/1921 | Kawakita | 422/904 |
| 1,408,625 | 3/1922 | Miles | 422/904 |
| 1,453,435 | 5/1923 | Buettner | 422/904 |
| 2,822,327 | 2/1958 | Hammesfahr et al. | 422/186.07 |
| 3,996,122 | 12/1976 | Lowther | 422/186.11 |

FOREIGN PATENT DOCUMENTS 8115004  7/1983  Japan ............................... 422/186.07

Primary Examiner—John F. Terapane
Assistant Examiner—Susan Wolffe

[57] ABSTRACT

The electric fixation of nitrogen from air is enhanced and made more efficient by the simultaneous multiple use of the electric discharge for both reacting nitrogen and oxygen to nitric oxide and for generating other specific oxidizing agents for the further oxidation of nitric oxide to higher oxides in that this special cell thereby rapidly effects not only the oxidation of nitrogen to nitric oxide but also rapidly oxidizes that nitric oxide to higher oxides of nitrogen products and thereby provides a means for the rapid absorption of the fixed nitrogen products from the electric discharge zone where the discharge would otherwise destroy much of the same product nitrogen which it is generating. The rapidly soluble higher oxides of nitrogen are rapidly absorbed by and held in an aqueous solution of these products flowing within the cell and they are converted directly to nitric acid in the solution as it flows from the cell.

4 Claims, 6 Drawing Figures

MULTIPLE OXIDATION NITROGEN FIXATION

This invention is a system of nitrogen fixation that uses an electric discharge through a mixture of nitrogen and other gases in order to form compounds of nitrogen. The present invention resembles many early nitrogen fixing systems that involved the use of the high voltage arc to react nitrogen and oxygen into nitric oxide and it is like the early art that sought to avoid the use of the very hot arc. While very hot arcs produced large percentages of nitric oxide they consumed disproportionately larger quantities of electricity and many means were developed of controlling the energy density of the electric discharge by spreading out the arc through a large volume of reactant gases. One of the early, sucessful methods of subjecting a large volume of air to the electric discharge was the Bradley and Lovejoy process at Niagara Falls, N.Y. in 1902. In this process a multitude of thin acrs were rapidly started and then extinguished to heat a large volume of air and to quickly cool the nitric oxide that was formed. Since nitric oxide is destroyed at temperature of 1200 C., the nitric oxide was generated by the arc was rapidly cooled through intermediate temperature ranges in order to minimize the length of time in those temperature ranges which could destroy nitric oxide. The early art therefore is characterized by systems which advantageously spread out the discharge zone through a large volume and rapidly cooled the products of the discharge. Other examples of such early art are the Bikeland—Eyde process as well as the Schonherr—Hessberger process, the Wielgolaski Furnace, the Crossed Discharge process by William J. Cotton In these processes as well as in later processes like those of Treharne et al in U.S. Pat. Nos. 4,010,897 and 4,256,967 current flows directly from one electrode to another through the reacting gas. In other systems which more closely resemble the present invention, a dielectric is interposed between the electrodes and energy density of the discharge is limited by the electric capacitance that is formed by the dielectric and the size of the electrodes when they are regarded as capacitor plates. Ozonizers that produce ozone from oxygen by an alternating current with electrode on either side of a glass plate are examples of systems which employ this basic type of discharge but the discharge is made much more intense than that employed in an ozonizer. Another example of a discharge with a dielectric interposed is that of the reactor invented by E. G. Rochow, U.S. Pat. No. 3,421,988. My previous invention U.S. Pat. No. 3,677,931 uses the same type of discharge but takes means of increasing the field intensity to increase the energy density. In the Rochow patent cited the discharge is employed in conjunction with a catalytic surface so that electrically excited chemical species might react upon the catalytic surface to form chemical compounds. But it differs from my present invention in that the catalytic surface is not a liquid surface that is used to quickly cool the products and remove them from the reaction zone as mine is. The Rochow invention does not specify its use for fixing nitrogen nor describe a means of reaching a sufficient energy density to do so. An objective of the present invention is to not only oxidize nitrogen to nitric oxide but to provide a subsequent rapid oxidation of nitric oxide to nitrogen dioxide as an integral part of the nitrogen fixing process to achieve the more rapid and efficient generation of nitric oxide. Since nitric oxide is very poorly absorbed in water the rate determining step in the sucessful conversion of nitric oxide to a product nitric acid was the slow oxidation in air of nitric oxide to nitrogen dioxide, but in this invention it is found that it is very advantageous to achieve this oxidation in the immediate vicinity of the electric discharge and in an oxidizing solution because the oxidizing agents are those which can be provided by controlling the electric discharge or by alternate discharges.

Accordingly, an essential element of the present invention is the provision of a discharge that will efficiently and cost effectively generate those products which will oxidize nitric oxide in solution as well as react nitrogen and oxygen into nitric oxide. To provide such a discharge it must be understood that the increase of electric energy through a given volume of gas produces an increase in the temperature of the gas and a higher concentration of nitric oxide, but the cost of achieving this high energy density is disproportionately higher than the increase in the yield of nitric oxide above certain temperatures. The most effective previous systems provided one means or other of diffusing the discharge over a large volume of gas. In an a.c. ozonizer the electric energy may be so diffuse and the discharge so mild in energy density that nitric oxide is practically undetectable. At higher current densities a brush discharge is formed and both ozone and nitric oxide are formed. In this present invention the diffusion of the discharge out through a significant volume of gas takes place as it does in an a.c. ozonizer that is driven at discharge energy densities greater that those employed for the generation of ozone alone. In accord with this concept, a discharge is diffused out across an entire area between the surfaces of opposing a.c. electrodes which are seperated by a dielectric material and a gas filled cavity. Specifically, the discharge takes place in the cavity between one electrode and the dielectric material and its dimensions are determined by the areas of the opposing electrode surfaces which confront each other across the discharge zone. The energy density in the discharge zone is controlled by frequency and voltage levels across the electrode plates sufficient to provide high yields of products while not being so high as to consume a disproportionately large amount of electric current. The present invention concerns the linkage between this special type of discharge and the use of a liquid electrode in conjunction with that discharge.

This invention is about a way of increasing the yield of fixed nitrogen products within the gaseous electric discharge zone by a generation and unique utilization of multiple products which react and interact to provide a net increase in product yield. The interaction of the multiple products provides a novel way of rapidly removing the principal product from the reaction area once it is formed there. This diminishes the destruction of the product species by the same electric discharge which created it and enhances the net efficiency of the system as a whole. The rapid product removal is herein achieved by a unique chemical absorbtion and reaction system that results from dissolving the multiple discharge products in a flow of water that is acted upon by the discharge. In the principal embodiment water vapor and air are reacted in an electric discharge to thereby produce not only the principal product which is nitric oxide but to produce the additional products of ozone and hydrogen peroxide. These products all dissolve in water that is present in the reaction chamber. Then the dilute aqueous solution which is formed at first becomes increasingly more capable of dissolving more of the discharge products as it becomes more concentrated until a quite concentrated solution is achieved. The dynamics of the multiple interactions are very advantageous for both the absorbtion and rapid conversion of nitric oxide. Hydrogen peroxide, formed by the interaction of air and steam with the discharge, oxidizes the absorbed nitric oxide to nitrogen dioxide and nitric acid. The resulting increase in the solutions acidity enables the solution to absorb more hydrogen peroxide and this in turn makes it a better oxidizing agent and it is then able to absorb and oxidize more nitric oxide. Without the help of these oxidizing agents nitric oxide by itself is only slightly soluble in water, but oxidized to nitrogen dioxide it rapidly reacts with water. Absorbed ozone also oxidizes the nitric oxide to nitrogen dioxide. As each product of the electric discharge is absorbed into the aqueous solution flowing through the reaction chamber, the solution becomes a more active absorber of the other products until it becomes an effective means of removing each product from the electric discharge reaction zone. The reaction chamber in which the products of the electric discharge are formed is configured in such a way as to enable the electric discharge to take place against a column of streaming water. This configuration achieves multiple purposes in that the water column is able to provide the solvent for the solution which rapidly oxidizes nitric oxide by dissolving hydrogen peroxide and ozone. Simultaneously, the water stream through this cell provides an electrically conductive electrode for the required two electrode discharge. Also this water column provides a means of atomization and vaporization of the water that is necessary for the production of hydrogen peroxide within the electric discharge. The water from the column that is atomized by the discharge provides a large water surface area for the rapid absorbtion of the chemical products of the discharge. This same flow of water through the electric reactor provides a convenient means for the rapid cooling of the discharge products through the 1200° C. temperature range which destroys nitric oxide. It also provides a way of removing the final product, nitric acid.

It is not intended to limit the basic inventive concept to the use of the high intensity "brush" discharge which is used in the principal embodiment to generate all of the essential products in a single type of discharge. In other embodiments a variety of intensities are employed simultaneously in a number of seperate reaction zones. In one embodiment sucessive discharges of different intensities are employed in the same discharge chamber and each of the essential products, seperately generated by a discharge of a different intensity, is mixed in a continuously cycling aqueous solution. Because there is insulating material between the electrodes used for this type of discharge, the amount of current that can flow through the discharge region is limited by the capacitance between the electrodes. This current is proportional to the voltage and to the frequency of the alternating current. The excited gas particles offer some electrical resistance to the flow of the current that is exciting them, but the capacitive reactance of the reaction chamber also critically limits the amount of current that can be used by the chamber to excite the gas particles that are being made to react. The effect of this capacitive reactance can be seen from ohms law as applied to alternating currents in which the limiting effect of electric capacitance can be seen. Accordingly, current is equal to voltage divided by the reciprocal of the product of twice the value of pi multiplied by both the frequency and the capacitance. When this equation is reduced it simply means that, when resistance is ignored, the current corresponds to the product of each of the following: of the voltage, the frequency, the capacitance, and twice the value of pi. As a consequence of this relationship only low current densities can flow through reaction chambers in which the frequency and voltage are relatively low. Low current densities are conducive to the production of large quantities of ozone and very small quantities of nitric oxide. Very little nitric oxide is produced at frequencies of 60 HZ to 600 HZ but large quantities of ozone are produced at these frequencies with the moderate field strengths of 6000 volts to 10,000 volts. On the other hand, at much higher frequencies from a few thousand cycles per second to three hundred kilohertz considerable quantities of nitric oxide are produced with progressively less ozone being produced as the frequency is increased. At these higher frequencies the energy of the discharge may be concentrated into a much smaller volume because these high frequencies enable small electric capacitance, associated with a small volume reactance chamber, to carry relatively large currents through a small volume of gas. The increase in current per unit volume means that there will be an increase in energy density and higher energy densities produce an electric discharge of an average higher temperature in the gases being reacted. As the energy density increases and the average discharge temperature increases the percentages of nitric oxide increase and the percentages of ozone and hydrogen peroxide decrease. The most advantageous proportions of the multiple products are determined by a selection of frequency and voltage to match the electric capacitance and physical volume of the reaction chamber. The proportions of each product are determined with a view to providing an aqueous solution of high and rapidly absorbtive qualities for each of the products, especially for nitric oxide. The most simple way to provide for the adjustment of the energy density within the reaction chamber is by the use of a variable frequency power oscillator in the principal embodiment. The frequency of this oscillator is then adjusted until the highest yield of fixed nitrogen is achieved in the solution in a given time for a unit amount of current consumed. Other means are also used in other embodiments to insure that the necessary multiple products will be available for absorbtion in the aqueous solution. When high frequency current is available at a specific frequency, the dimensions of the reaction chamber are adjusted to match the available frequency. The reaction chamber is designed to have a capacitive reactance of a value that will provide the optimum energy density to generate the multiple products. In one embodiment a reaction chamber with multiple compartments is employed and each compartment is then configured for an electric discharge with a different energy density. The capacitive reactance of one compartment is such that less current is admitted to it than to another compartment in order to create a relatively mild discharge in that compartment. The compartment with the current limited by a relatively high capacitive reactance and having a relatively mild electric discharge provides for the generation of adequate amounts of ozone and hydrogen peroxide. Similarly, the capacitive reactance of an alternate compartment is made lower to admit larger quantities of current and to thereby produce a more energetic electric discharge in that compartment. The compartment with the higher energy density provides the desired quantities of nitric oxide. Additional means of controlling the current flow to each compartment may be employed such as the use of inductance or capacitance in series with the current to the compartment. The absorbent aqueous solution is cycled through each compartment to absorb and mix the products of each compartment so that the multiple products of the compartments will react together in the solution to provide the final product of nitric acid with dissolved higher oxides of nitrogen.

Just as the functions of each compartment may be specialized for the generation of large amounts of a specific product by the control of the electric current to that compartment when the same frequency of current is used in each compartment, so too in alternate embodiments different compartments are driven by currents of different frequencies. One compartment is driven by a frequency of from 60 HZ to 600 HZ for the production of ozone or hydrogen peroxide and another compartment has a frequency of 1 KHZ to 300 KHZ placed across its electrode in order to produce high yield of nitric oxide. The absorbent aqueous solution is cycled through each compartment to absorb and to mix the products of each compartment so that the multiple products of the compartment will react together in the solution and enhance the absorbtion of the products from the compartments.

FIG. 1 of the drawings shows a diagram of capacitor plates separated by a dielectric and a space beneath the dielectric.

Figure 1:
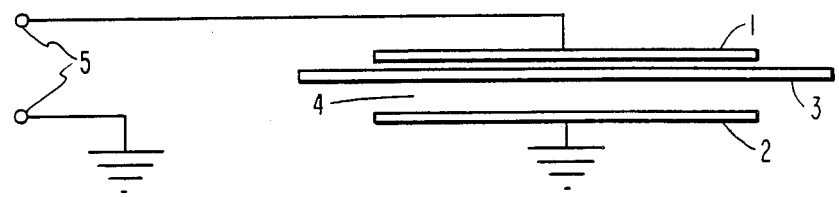

Referring then to FIG. 1, the drawings show a schematic diagram of electrodes 1 and 2 which are separated by dielectric insulator 3 and by electric discharge zone 4. The insulator 3 provides a dielectric between 1 and 2 and causes electric capacitance to exist between 1 and 2. Thereby 1 and 2 become the opposing plates of an electric capacitor. The capacitance so formed provides for the passage of alternating electric current between 1 and 2. The quantity of current that flows across 1 and 2 depends upon the frequency of the A.C. current, upon the voltage and upon the area of the plates of 1 and 2. When the voltage across 1 and 2 is sufficiently elevated, as for example by a voltage of about 6000 volts or more, and when the physical separation between 1 and 2 is not excessively large in relation to the voltage, but is for example about a guarter of an inch for a voltage of 6000 volts, then an electric discharge will take place between 2 and 3 in zone 4. The intensity of this discharge depends upon the amount of current flow per unit area across plates 1 and 2. The current in turn depends upon the voltage and frequency of the current. Certain gas state chemical species are activated and reacted into product species in zone 4 by the electric discharge there. For instance, oxygen is reacted to ozone when subjected to a mild discharge in 4 called, "the dark discharge". Air is reacted to nitric oxide by a strong discharge called, "the flaming are" in zone 4. Similarily, oxygen and water vapor are reacted in 4 to produce hydrogen peroxide. At intermediate intensities of current in "the brush discharge" air and water vapor are reacted to produce ozone, nitric oxide and hydrogen peroxide. Electric contacts 5 bring alternating current from an A.C. source not shown.

Figure 2:
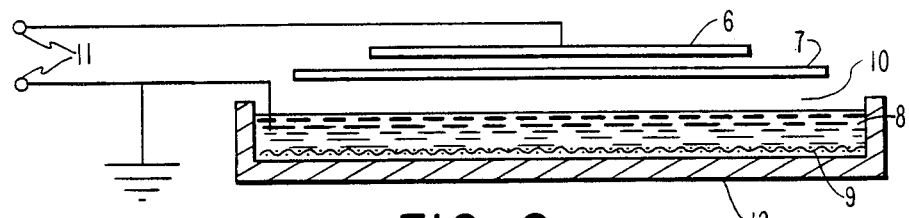
FIG. 2 shows capacitor plates the lower one of which is a liquid electrode plate and these two plate like electrode are separated by a dielectric and a space.

In FIG. 2 of the drawings the diagram of electrode 6 corresponds to 1 of FIG.1. Similarly, insultor 7 corresponds to 3 of FIG. 1 and electrically conductive aqueous solution 8 corresponds to the electrode 2 in FIG. 1, but in this FIG. 2 solution 8 serves additional functions to its function of being a conductive element for an electric discharge. In this FIG. 2 an electric discharge between 7 and 8 provides the same reactions as take place between 2 and 3 of FIG. 1 depending upon the energy densities of the discharge as described for FIG. 1, but additionally electrode 8 of this FIG. 2 is able to provide the water vapor necessary for the generation of hydrogen peroxide by a discharge through air. It provides that vapor by the heating of the solution 8 which takes place as the discharge impinges the conductive surface of 8 and converts a small portion of 8 to steam and aeroaol. The same mechanism which produces the water vapor also provides a means for the rapid absorbtion of the chemical products of the discharge, especially nitric oxide. When multiple products are generated by the discharge through air at intermediate electric energy intensities, the absorbtion of any of the products enhances the ability of the solution to absorb other products. For instance, when 8 absorbs a quantity of hydrogen peroxide and the ability of 8 to absorb nitric oxide is increased. The nitric oxide is oxidized by the hydrogen peroxide in 8 and the solution itself becomes more acidic as nitric acid is formed by the interaction of the higher nitrogen oxides with water. The increase in acidity in turn enables the solution to absorb more hydrogen peroxide and become a better oxidizer to better absorb and react nitric oxide into the more soluble nitrogen dioxide. Electric discharge zone 10 of this FIG. 2 corresponds to 4 of FIG. 1 except that in this FIG. 2 the solution 8 at the base of zone 10 provides for a more effecient fixation of nitrogen by rapidly removing the products of the discharge to prevent them from being destroyed by the same electric energy which generated them. Electric contacts 11 conduct high voltage A.C. current from a source not shown to electrodes 6 and 8. In series with 8 and its electric source is metal screen 9 which assists in distributing the electric current throughout solution 8. Liquid container 12 holds solution 8.

Figure 3:
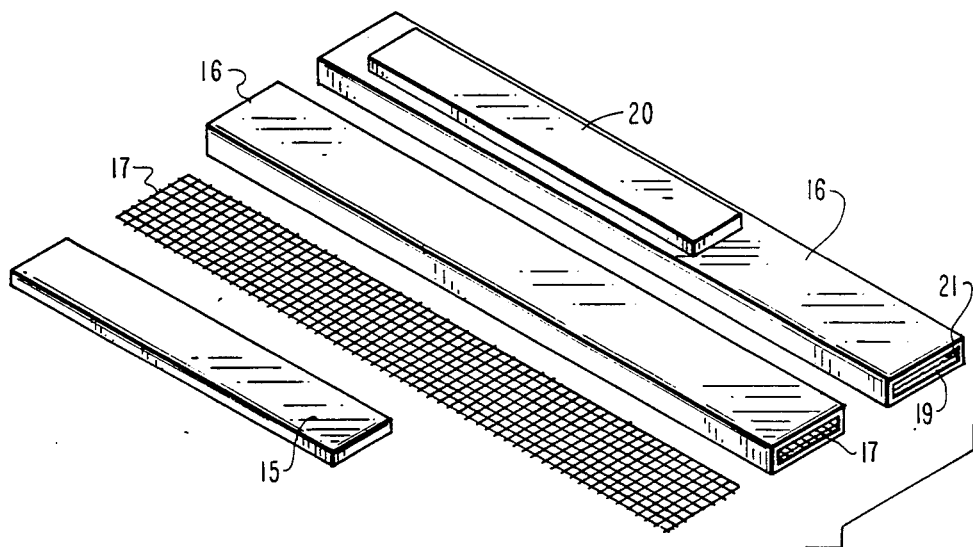
FIG. 3 shows separate component parts of a reaction chamber in the form of a plate, a screen and long, narrow box like discharge enclosures.

In FIG. 3 of the drawings, reaction chamber electrode 15 is shown by itself before it is shown in its final mounted position. The electrode 20 is the same as electrode 15 but 20 is the electrode 15 after it is mounted on square tube 16. The reaction chamber tube 16 is a duct made of quartz or other material greatly resistant to thermal shock. The electrically conductive screen 17 is to be placed inside 16 and along the bottom side within 16 in order to conduct electric current to an electrically conductive solution 19 flowing within 16. Solution 19 serves as an opposing electrode to 20. Electrode 19 is separated from 20 by the dielectric top side of 20 to provide electric capacitance between 19 and 20. Above the aqueous solution 19 and within tube 16 is a cavity which is the reaction zone 21. The electric capacitance between 19 and 20 permit electric current of high alternating voltage to flow across these electrode and through 21 to thereby produce an electric discharge in 21. The reactants flowing through 21 and the products that result there from the action of the discharge are employed according to the discription given in FIG. 2. That is to say air flowing through 21 is mixed with water vapor generate within 21 to produce nitric oxide, hydrogen peroxide and ozone. These first products then react in solution 19 to provide the final product, nitric acid.

Figure 4:
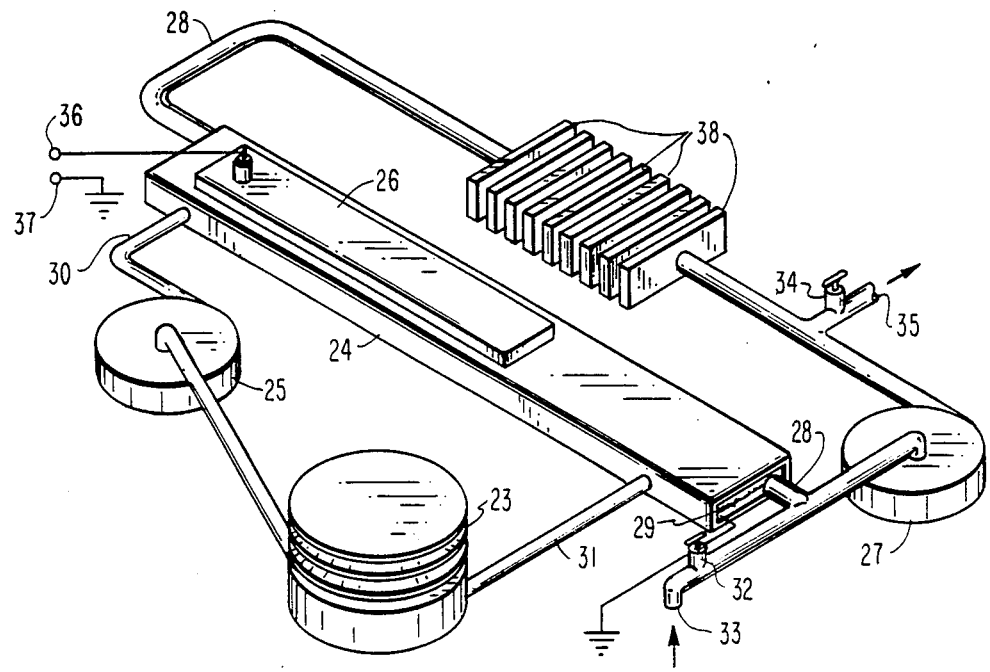
FIG. 4 shows interconnected parts of a simple discharge system having a long, narrow reaction chamber, a duct with cooling fins, two pumps and a reservoir.

In FIG. 4 the reaction chamber 24 is a long rectangular quartz box like 16 of FIG. 3. Electrodes 26 and 29 correspond to 20 and 19 of FIG. 3 and in every way the action of 24 is that described in FIG. 3 with certain additions. In this FIG. 4 external fluid pump 27 is shown with ducting 28 for circulating solution 29 through 24. Gas circulation pump 25 circulates reactant gases through gas reservoir 23 and through reaction chamber 24. In the principal embodiment the gas that is reacted by the electric discharge in 24 is air but other mixtures are used in other embodiments such as oxygen enriched air in ratios of approximately four volumes of oxygen to each volume of nitrogen. Gas inlet duct 30 to chamber 24 is above the liquid level of solution 29 and gas exit duct 31 from chamber 24 is also above that level. Ducting 28 provides fluid flow communication between liquid pump 27 and 24. Also ducting 28 connects to 24 below the liquid level of 29. Solution inlet valve 32 controls the rate at which water is admitted to circulating solution 29 through water inlet duct 33. Product exit valve 34, downstream of pump 25, controls the rate at which nitric acid solution 29 is removed from product exit port 35. Electric connectors 36 and 37 conduct high voltage a.c. potential to 26 and 29 to produce an electric discharge in 24 beneath 26. A significant portion of the length of 24 at the exit end of 24 is free of electric discharge as it is beyond the reach of electrode 26. This is a mixing area in which the gas products of the discharge not already dissolved into 29 are dissolved into that solution. Cooling fins 38 cool 29 to enhance its absorbtion properties. In the princopal embodiment the electric discharge in 24 is a discharge of a single intensity which is a "brush" discharge and it is of sufficient energy density to produce nitric oxide, hydrogen peroxide and ozone. In an alternate embodiment, each of these three products is generated in 24 at a different time when different energy densities are produced at different times in 24. Each of the same three products is generated at the particular energy density that favors high yields for that particular product. During the distinct period of high energy density nitric oxide is generated and then absorbed in 29. Later in a period of intermediate intensity in the discharge hydrogen peroxide is produced and so on.

Figure 5:
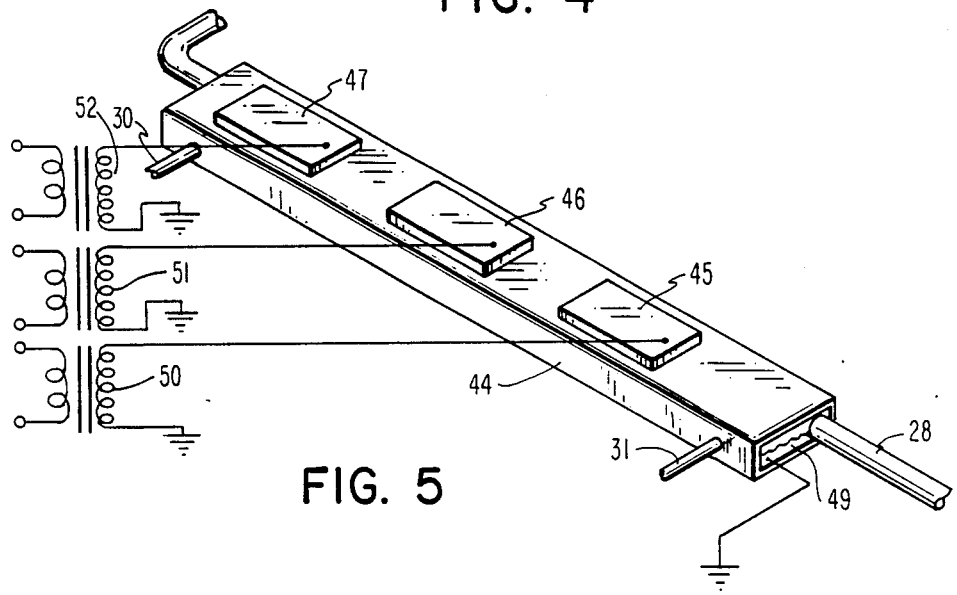
FIG. 5 shows a long narrow reaction chamber supporting three capacitor plates which are connected to three electric transformers.

In FIG. 5 reaction chamber 44 is used in place of chamber 24 in FIG. 4 in another embodiment. In FIG. 5 three distinct discharge each of a different intensity take place in 44 at the same time. Each discharge is associated with a different electrode and power source. Ozone is generated beneath electrode 45 in 44 in a "dark" discharge. Hydrogen peroxide is formed beneath electrode 46 in 44 in a "brush" discharge between 46 and 49. Nitric oxide is generated in that part of the cavity within 44 which is beneath electrode 47 by a very energetic discharge called, "the flaming arc" which takes place between electrode 47 and solution electrode 49. The physical separation of the electrodes 45, 46 and 47 along the length of 44 is shown in FIG. 5, but the representation of the separation given in FIG. 5 is diagramatic and not intended to be according to scale. Adequate separation between the electrode is made to provide for the absorbtion of significant proportions of the products of a discharge into the solution 49 before the flow of 49 reaches the vicinity of the following electrode. Gas inlet duct 30 of FIG. 4 is connected to 44 of FIG. 5 as shown in FIG. 5 when 44 is used in place of 24. Similarly, gas exit duct 31 of FIG. 4 is connected to 44 of FIG. 5 when 44 replaces 24 and the same is true of ducting 28. In every respect reaction chamber 44 is the same in its functioning as is described in FIG. for chamber 24 except that 44 has three separate sets of electrodes and a corresponding number of discharge in place of a single set of electrodes and a single discharge of one intensity. In this FIG. 5 the pumps 25 and 27 are omitted as are valves 32 and 34 as well as inlet and exit ports 33 and 35 in order to more clearl show the relationship of the power sources 50, 51 and 52 to the three electrode sets 45 with 49, 46 with 49 and 47 with 49. The electric transformer 50 provides a high voltage of from 6000 volts to 20,000 volts to electrode 45 and to solution electrode 49 at a frequency of of 60 HZ to 600 HZ for the generation of ozone from the oxygen content of the gas in 44. Other voltages may also be used as well as other frequencies provided means are used to limit the current to that required for a discharge of low energy density. The electric transformer 51 provides a high voltage of from 6,000 volts to 20,000 volts at a frequency of 60 Hz to 2,000 HZ to electrodes 46 and 49 to provide an intermediate intensity discharge in 44 beneath electrode 46. In other embodiments other frequencies and voltages are used together with standard means of controlling the energy density of the that of a moderately energetic discharge. The electric transformer 52 provides a voltage of 6000 volts or more at a frequency of 10,000 HZ or more to electrodes 47 and 49 in order to produce an high intensity electric discharge through the nitrogen and oxygen in 44 beneath 47. It is to be understood that transformers 50,51 and 52 are each to be powered by a generator or other power supply such as a power oscillator, but these are not shown as they are well understood in electric art. It is not intended to limit the basic inventive concept to the use of transformers but a variety of high voltage, high frequency electric sources may be employed such as generators operating on variable capacitance as well as spark gap oscillators etc.

Figure 6:
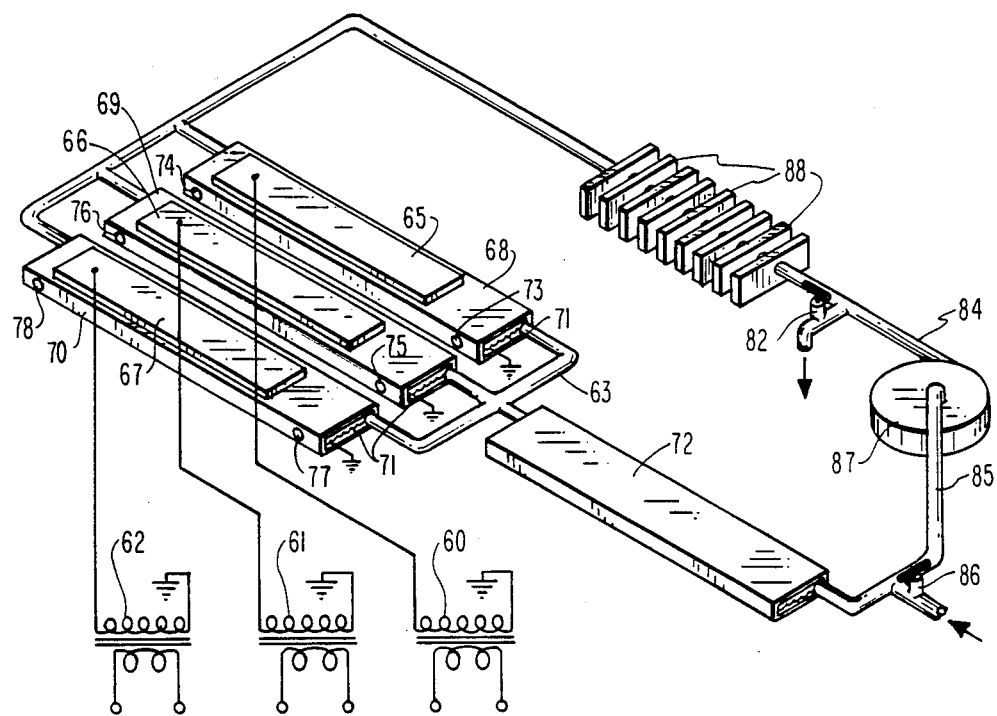
FIG. 6 shows three reaction chambers in the form of reactangular boxes placed side by side and electrically connected to three electric transformers. The chambers are connected by a manifold to a rectangular mixing chamber and to a finned cooler and a pump.

Referring then to FIG. 6 of the drawings, parallel reaction chambers 68, 69 and 70 are long, rectangular boxes of quartz or other material of high dielectric strength with thermal shock resistant characteristics. Each of these three chambers is supplied with high voltage at a different frequency in order to provide an electric discharge that is of a different intensity in each chamber. High voltage transformers 60,61 and 62 in this FIG. 6 correspond to transformers 50,51 and 52 respectively of FIG. 5 and each transformer increases voltage at a different frequency from three different sources of electric energy not shown. Transformer 60 sends power to electrodes 65 and 71. Transformer 61 powers electrodes 66 and 71 and transformer 62 sends current to electrodes 67 and 71. The principal products of the different electric discharges of 68, 69 and 70 are ozone, hydrogen peroxide and nitric oxide respectively. The multiple electrode 71 is an electrically conductive solution at a common, ground potential in each reaction chamber. Solution 71 flows through each reaction chamber 68, 69 and 70 and then through mixing chamber 72. The individual products of each of these reaction chambers is is absorbed into 71. The branch flows of 71 through each reaction chamber are converged in manifold tube 63 and mixed in 72. The absorbed nitric oxide is oxidized in solution 71 by absorbed hydrogen peroxide and ozone into nitrogen dioxide and nitric acid. The circulation of 71 is provided by pump 64 through ducts 84 and 85 and manifold 63. Gas inlet and exit ports 73 and 74 respectively admit and exit reactant gases to 68. Similarly, inlet and exit ports 75 and 76 respectively admit and exit reactant gases to 69. In the same way inlet and exit ports 77 and 78 admit and exit reactant through 70. Product exit valve 82 removes a portion of 71 to be used as the final fixed nitrogen product. Water is added to the solution through water inlet valve 86. The top sides of each chamber, 68,69 and 70, provide the dielectric material necessary for the electric capacitance required between the electrodes of each chamber. The cooling fins 88 on duct 84 assist in keeping solution 71 sufficiently cool to be able to absorb the products of the electric discharge. Liquid pump 87 performs the same function as pump 27 in FIG. 4.

I claim:

1. An electric discharge reactor for the production of nitric acid comprising:

an electrically insulating casing in the form of a long rectangular box of high dielectric strength and high thermal shock resistance defining a chamber for both high voltage discharge of about 6000 volts or more and for discharge products absorbtion, and having inlet opening means and outlet opening means for gas and for liquid solution communicating with said chamber;

an electrically conductive liquid electrode flowing through said discharge chamber along the base of the chamber and beneath a discharge zone in the chamber and in physical and electric contact with the discharge, said liquid electrode being an aqueous solution of multiple products of said electric discharge;

an electric discharge electrode plate in physical contact along its lower surface with the top side of said chamber and electrically installed from said discharge zone and from said liquid electrode by the dielectric top side of said casing, thereby producing electric capacitance across said discharge zone for limiting the energy of the discharge and for causing the discharge to be diffused out across the space between the electrodes, thereby controlling the energy density of the discharge through the discharge zone;

power source means for applying a high voltage discharge potential between said plate electrode and said liquid electrode within said chamber, thereby producing an electric discharge within said discharge chamber to form nitric oxide, hydrogen peroxide and ozone, as first products, from nitrogen, oxygen and water supplied to said chamber through said inlet opening means, said first products being absorbed and reacted in said liquid electrode to form nitric acid, said nitric acid being removed from said chamber through said liquid outlet opening means, said power source means including an a.c. high voltage power source which provides from 6000 volts to 20,000 volts connected between said discharge electrodes;

liquid electrode, aqueous solution circulation and cooling means to flow said solution through said chamber in multiple repeated cycles for absorbing the first products of the discharge and then to react them in said solution thereby making said solution increasingly more absorbtive of said gas discharge products, said circulation and cooling means being in the form of a small liquid pump and ducting with cooling fins in circular series fluid flow communication with said reaction chamber through said inlet and exit opening means, said ducting having inlet and exit valves with ports for admitting water and for exiting product nitric acid.

2. An electric discharge reactor as in claim 1 in which the a.c. electric discharge produced by the power source means is a discharge the intensity and energy density of which changes from one period in time to another, having different energy densities in different time periods, and in which said power source means is capable of multiple frequency and power output levels of high voltage through alternate switchable connections by which one power level and frequency is connected to the electrodes in one time period and other power levels and frequencies are connected to said electrodes in other time periods to there's produce one of said electric discharge products in one time period and another product in another period and so on cyclically.

3. An electric discharge reactor for the production of nitric acid comprising:

an electrically insulating casing in the form of a long rectangular box of high dielectric strength and high thermal shock resistance defining a chamber for both a plurality of electric discharges each of a different energy density and for discharge products absorbtion, and having inlet opening means and outlet opening means for gas and liquid communication with said chamber;

an electrically conductive liquid electrode flowing through said discharge chamber along the base of the chamber and through the base of zones in the chamber in which electric discharges take place and in physical and electric contact with each electric discharge, said liquid electrode being an aqueous solution of the products of each discharge;

a plurality of electric discharge electrode plates each in physical contact along its lower surface with the top side of said chamber and each electrically insulated from said discharge zone and from said liquid electrode by the dielectric top side of said casing, thereby each producing electric capacitance across said discharge zone for limiting the energy of the discharge and for causing the discharge to be spread out across each of the spaces between each electrode plate and the liquid electrode thereby controlling the energy density of each discharge through its discharge zone;

multiple power source means for applying a different frequency and power of high voltage potential of about 6000 volts or more between each plate electrode and said liquid electrode within the chamber, thereby producing discharges each having its own intensity within said chamber each discharge producing high yields of one of multiple products and each discharge having a particular energy density of discharge to thereby form within the entire chamber a combination of discharge products, nitric oxide, hydrogen peroxide and ozone, from nitrogen, oxygen and water supplied to said chamber through said inlet opening means, said power source means including a plurality of a.c. high voltage power sources each of which different sources being connected to a different one of the plate electrodes and the solution electrode;

liquid electrode, aqueous solution circulation and cooling means to flow said solution through said chamber in multiple repeated cycles for absorbing the gas products from the discharge and to react said products in the solution thereby causing said solution to become increasingly more absorbtive of said products, and being in the form of a liquid pump and ducting, with cooling fins in circular series fluid flow communication with said chamber through said inlet and exit opening means, said ducting having inlet and exit valves with ports for admitting water and for exiting product nitric acid.

4. An electric discharge reactor for the production of nitric acid comprising:

electric discharge enclosure means in the form of long rectangular boxes of high dielectric strength and high thermal shock resistance each box defining a chamber for both high voltage electric discharge of about 6000 volts or more and for absorbtion of discharge products, and each box having inlet and outlet opening means for gas and for liquid solution flow communicating with each of said chambers;

an electrically conductive liquid electrode flowing through each of said chambers along the base of each chamber and through the base of zones in each chamber in which zones electric discharges take place, and in physical and electric contact with each electric discharge, said liquid electrode being an aqueous solution of a combination of the products of each discharge;

a plurality of electric discharge electrode plates each single plate being in physical contact along its lower surface with the top side of a different one of said chambers and each plate being electrically insulated from the discharge zone of the chamber to which it is attached and from said liquid electrode by the dielectric top side of the chamber to which it is attached, thereby each chamber having electric capacitance across its discharge zone for limiting the energy of the discharge and diffusing the discharge out across the space between the electrode plates in each chamber thereby controlling the energy density of each discharge through its discharge zone in each chamber;

multiple power source means for applying a different frequency and power of high voltage a.c. potential to each chamber to produce different intensity discharges in each chamber for the production of a different discharge product in each chamber, thereby to form nitric oxide in high yields in a chamber having a very high energy density and receiving very high frequency and power and thereby to form hydrogen peroxide in a second chamber having an intermediate energy density and connected to a source of intermediate power, and thereby to form ozone in a discharge chamber having very low energy densities and receiving low power from a low frequency electric source, said power source means including a plurality of a.c. high voltage power sources which provides from 6000 volts to 20,000 volts each of which is connected to one plate electrode and to said electrically conductive solution electrode;

liquid electrode, aqueous solution circulation and cooling means for providing a stream of said aqueous solution through each of said reaction chambers in such a circular fluid flow communication among the chambers that the flow from each chamber is caused to mix and mingle with the flows from the others and then again flow through each chamber in multiple repeated cycles, and in which flow said gas discharge products are absorbed and interacted, thereby providing a highly absorbtive solution for further, more rapid absorbtion of said gas discharge products, said absorbtion and cooling means being in the form of a liquid pump and tubing with cooling fins in circular series fluid flow communication with a parallel group of said reaction chambers, said chambers being connected in parallel to each other by manifold ducting connecting the inlet openings of each to the inlet openings of the others and by other manifold ducting connecting the outlet openings of each together, said tubing having inlet and exit valves with ports for admitting water and for exiting product nitric acid.

* * * * *